Patented Dec. 24, 1946

2,413,248

UNITED STATES PATENT OFFICE 2,413,248

POLYAMINES AND PROCESS FOR PREPARING THEM

Murray Senkus, Terre Haute, Ind., assignor to Commercial Solvents Corporation, Terre Haute, Ind., a corporation of Maryland No Drawing. Application February 21, 1945, Serial No. 579,161

8 Claims. (Cl. 260—345)

My invention relates to new and useful polyamines. More particularly, it is concerned with polyamines having the following structural formula:

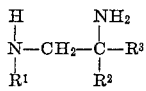

wherein $R^1$ may be aralkyl, furfuryl, or tetrahydrofurfuryl, and $R^2$ and $R^3$ represent alkyl groups. This case is a continuation-in-part of my co-pending Serial No. 455,932, filed August 24, 1942.

Polyamines of the above type are readily prepared from the corresponding nitro amines by subjecting the latter to catalytic liquid phase high pressure hydrogenation. In accordance with this procedure, the nitroamine, catalyst and a suitable solvent, such as methyl or ethyl alcohol, are introduced into a pressure hydrogenation apparatus of conventional design, such as that described at pages 29 to 45 in Adkins' treatise on "Reaction of Hydrogen" (University of Wisconsin Press, 1937), which comprises a cylindrical steel reaction vessel fitted with a flexible tubing for the introduction of hydrogen under pressure. The apparatus may be equipped with a suitable agitation means, and an electrical heating unit in order that the reduction may be effected under as widely varying conditions as are deemed necessary or desirable.

The catalyst utilized may be of any of several hydrogenation catalysts which are active under the operation temperatures employed. A number of such hydrogenation catalysts are described in Ellis' book on "Hydrogenation of Organic Substances," 3d ed. (1930). In the majority of instances, however, I have found that the well known Raney nickel catalyst usually gives the most satisfactory results. Numerous other hydrogenation catalysts are, nevertheless, quite satisfactory and will be found to be sufficiently active under the operating conditions employed to result in adequate yields of polyamines, which render the use of such catalysts practicable from an economical standpoint. For example, nickel precipitated from nickel carbonate, and supported on infusorial earth (Covert et al., J. Amer. Chem. Soc. 54, 1651 (1932)), or catalysts of nickel on silica gel (Holmes and Anderson, Ind. & Eng. Chem. 17, 280 (1925)), may also be employed. These catalysts are most active at temperatures above 80–85° C., however, and are less desirable for hydrogenation reactions occurring at lower temperatures. In general, it will be found preferable to utilize catalysts that are active at lower temperatures, due to the tendency of the nitro amines to decompose under conditions of elevated temperature and pressure.

Hydrogen is introduced into the apparatus in a manner such that the pressure exerted thereby will vary from approximately 300 to over 2000 pounds per square inch. In general, however, I prefer to use pressures ranging from between about 500 to 1000 pounds per square inch, but it is to be understood that other hydrogen pressures may be employed, their values generally being determined by the temperature used. The hydrogenation is preferably carried out at temperatures ranging from between about 30° and 50° C., with constant agitation for a period of from one to four hours. Temperatures of from 100° to 125° C., may nevertheless be utilized provided adequate precautions are taken with respect to the hydrogen pressure used. Ordinarily, optimum conditions in regard to time of reaction, temperature, pressure, and catalyst in any given instance, may readily be determined by simple experiment.

When the reduction is complete, the reaction mixture is removed from the apparatus, and the catalyst separated by filtration or other suitable means. The resulting filtrate is then distilled at atmospheric pressure to remove the solvents, after which a liquid, such as benzene or toluene, is added to the still residue for the purpose of removing the water formed during the reduction of the nitro compound. After all of the water is removed in this manner, the crude polyamine, if a liquid, is purified by rectification at atmospheric pressure or under vacuum, or by recrystallization from a suitable solvent, if it happens to be a solid under ordinary conditions.

The nitro amines employed as starting materials for the preparation of the polyamines of my invention, may be synthesized in accordance with the procedure described in my co-pending application, U. S. Serial No. 455,931, filed August 24, 1942. By this procedure, a primary or secondary aliphatic amine is reacted with formaldehyde to form the corresponding N-hydroxymethyl, mono-, or dialkylamine, which is in turn reacted with an equimolecular quantity of a secondary nitroparaffin to produce the desired nitro amine. The preparation of such nitro amines is preferably carried out at temperatures of from between about 25°–30° C. Temperatures above this range may be used, but in doing so, care should be exercised to avoid temperatures which cause the formaldehyde to be volatilized from the reaction mixture.

Although it may generally be desirable to reduce the substantially pure nitro amines, I have observed that highly satisfactory and frequently equally as good results are obtained by subjecting the entire reaction mixture, containing the crude nitro amines, to reduction in the presence of a suitable catalyst and solvent, as described above.

My invention may be further illustrated by the following specific examples.

Example I

One hundred parts of crude N-(2-nitroisobutyl)-benzylamine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30–50° C. After absorption of hydrogen had substantially ceased, the solution was removed from the apparatus, filtered, and the filtrate distilled at atmospheric pressure to remove the methyl alcohol. Two hundred parts of benzene were then added to the still residue and the water produced by the reduction of the nitro compound to the corresponding amine was removed as a constant boiling mixture with benzene, the latter being returned to the still until substantially all of the water had been separated from the crude polyamine. The residue was then distilled under reduced pressure and the fraction boiling at 105–106° C. at 8 mm. pressure was collected. The quantity of N-(2-aminoisobutyl)benzylamine recovered amounted to a conversion of about 55%. The product had a nitrogen content of 15.52% as compared to a calculated value of 15.73%.

Example II

One hundred parts of crude N-(2-nitroisobutyl)-1-phenylethylamine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30°–50° C. After absorption of hydrogen had substantially ceased, the solution was removed from the apparatus, filtered, and the filtrate distilled at atmospheric pressure to remove the methyl alcohol. Two hundred parts of benzene were then added to the still residue and the water produced by the reduction of the nitro compound to the corresponding amine was removed as a constant boiling mixture with benzene, the latter being returned to the still until substantially all of the water had been separated from the crude polyamine. The residue was then distilled under reduced pressure and the fraction boiling at 110° C. at 5 mm. pressure was collected. The quantity of N-(2-aminoisobutyl)-1-phenylethylamine recovered amounted to a conversion of about 90%. The product had a nitrogen content of 14.37% as compared to a calculated value of 14.57%.

Example III

One hundred parts of crude N-(2-nitroisobutyl)-tetrahydrofurfurylamine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30°–50° C. After absorption of hydrogen had substantially ceased, the solution was removed from the apparatus, filtered, and the filtrate distilled at atmospheric pressure to remove the methyl alcohol. Two hundred parts of benzene were then added to the still residue and the water produced by the reduction of the nitro compound to the corresponding amine was removed as a constant boiling mixture with benzene, the latter being returned to the still until substantially all of the water had been separated from the crude polyamine. The residue was then distilled under reduced pressure and the fraction boiling at 75° C. at 1 mm. pressure was collected. The quantity of N-(2-aminoisobutyl)tetrahydrofurfurylamine recovered amounted to a conversion of about 92%. The product had a nitrogen content of 16.02% as compared to a calculated value of 16.25%.

Example IV

One hundreds parts of crude N-(2-nitroisobutyl)-furfurylamine were mixed with one hundred parts of methyl alcohol and 5 parts of Raney nickel catalyst after which the resulting mixture was introduced into a suitable hydrogenation apparatus and sealed. Hydrogen was then added at a pressure of 500 pounds per square inch and at a temperature of 30°–50° C. After absorption of hydrogen had substantially ceased, the solution was removed from the apparatus, filtered, and the filtrate distilled at atmospheric pressure to remove the methyl alcohol. Two hundreds parts of benzene were then added to the still residue and the water produced by the reduction of the nitro compound to the corresponding amine was removed as a constant boiling mixture with benzene, the latter being returned to the still until substantially all of the water had been separated from the crude polyamine. The residue was then distilled under reduced pressure and the fraction boiling at 96–98° C. at 5 mm. pressure was collected. The quantity of N-(2-aminoisobutyl)furfurylamine recovered amounted to a conversion of about 36%. The product had a nitrogen content of 16.49% as compared to a calculated value of 16.66%.

The polyamines of the above-mentioned type are generally either colorless liquids or white solids. These amines are, as a rule, insoluble in water, but are soluble in the lower aliphatic alcohols, ether, and benzene. The lower molecular weight polyamines possess a strong ammoniacal odor, the intensity of which decreases with an increase in the molecular weight of the polyamine. The majority of these amines tend to decompose on distillation at atmospheric pressure.

The polyamines of my invention have been found to be useful in certain instances as intermediates for the preparation of surface active agents. They are likewise useful as intermediates in the preparation of numerous other valuable organic compounds and compositions. Additional uses of these products will readily occur to those skilled in the art.

My invention now having been described, what I claim is:

1. Polyamines of the formula

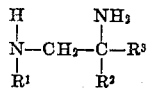

wherein $R^1$ is a member selected from the group consisting of aralkyl, furfuryl and tetrahydrofurfuryl, and $R^2$ and $R^3$ represent alkyl groups.

2. N-(2-aminoisobutyl)benzylamine.
3. N-(2-aminoisobutyl)tetrahydrofurfurylamine.
4. N-(2-aminoisobutyl)furfurylamine.
5. In a process for the preparation of polyamines of the formula

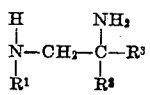

wherein $R^1$ is a member selected from the group consisting of aralkyl, furfuryl and tetrahydrofurfuryl, and $R^2$ and $R^3$ represent alkyl groups, the step which comprises subjecting the corresponding nitro amines to hydrogenation in the liquid phase in the presence of a nickel hydrogenation catalyst at a temperature not substantially in excess of 125° C.

6. In a process for the preparation of N-(2-aminoisobutyl)benzylamine, the step which comprises subjecting the corresponding nitro amines to hydrogenation in the liquid phase in the presence of a nickel hydrogenation catalyst at a temperature not substantially in excess of 125° C.

7. In a process for the preparation of N-(2-aminoisobutyl)furfurylamine, the step which comprises subjecting the corresponding nitro amines to hydrogenation in the liquid phase in the presence of a nickel hydrogenation catalyst at a temperature not substantially in excess of 125° C.

8. In a process for the preparation of N-(2-aminoisobutyl)tetrahydrofurfurylamine, the step which comprises subjecting the corresponding nitro amines to hydrogenation in the liquid phase in the presence of a nickel hydrogenation catalyst at a temperature not substantially in excess of 125° C.

MURRAY SENKUS.